Figure 1:
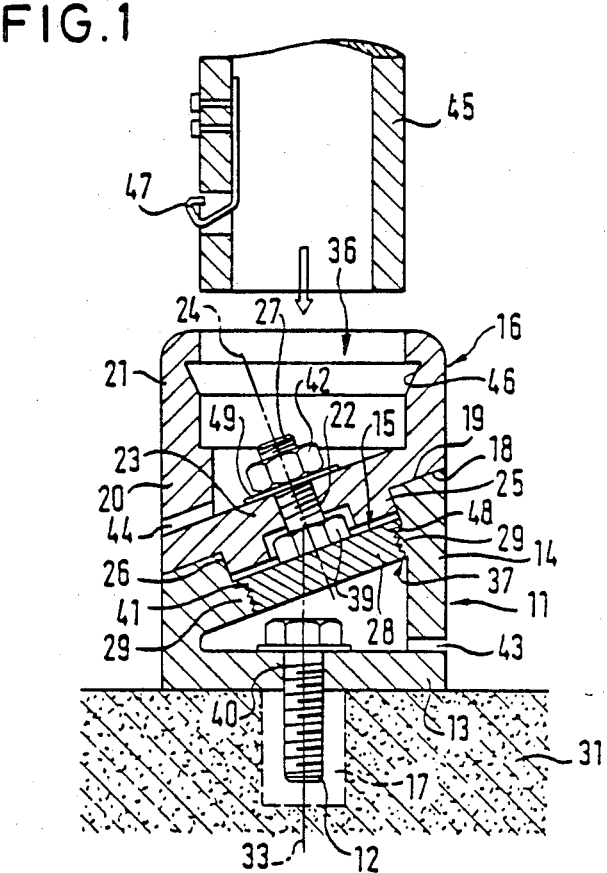

United States Patent [19]

Bollmann

[11] Patent Number: 4,603,526
[45] Date of Patent: Aug. 5, 1986

[54] GROUND SECURING DEVICE

[76] Inventor: Jean-Jacques Bollmann,
Löwenstrasse 29, CH-8021 Zürich 1,
Switzerland

[21] Appl. No.: 793,072

[22] PCT Filed: Dec. 10, 1984

[86] PCT No.: PCT/CH84/00193
§ 371 Date: Oct. 15, 1985
§ 102(e) Date: Oct. 15, 1985

[87] PCT Pub. No.: WO85/03731
PCT Pub. Date: Aug. 29, 1985

[30] Foreign Application Priority Data

Feb. 16, 1984 [CH] Switzerland ................. 746/84
Oct. 10, 1984 [EP] European Pat. Off. ....... 84112151.0

[51] Int. Cl.$^4$ ............................................ E02D 27/42
[52] U.S. Cl. .................... 52/296; 52/169.13; 403/86
[58] Field of Search .............. 52/295, 296, 169.13, 52/127, 79.9, 149, 156, 165, 166, 167, 169.1, 292, 297, 298; 403/86; 256/21

[56] References Cited

U.S. PATENT DOCUMENTS

| 656,314 | 8/1900 | Beerbower | 403/86 |
| 3,289,369 | 12/1966 | Marcus | 52/295 |
| 4,154,037 | 5/1979 | Anderson | 52/296 |
| 4,279,107 | 7/1981 | Bollmann | 52/296 X |

FOREIGN PATENT DOCUMENTS

| 2322987 | 4/1977 | France | 52/298 |
| 511249 | 8/1939 | United Kingdom | 52/295 |

Primary Examiner—J. Karl Bell
Attorney, Agent, or Firm—Townsend and Townsend

[57] ABSTRACT

A base support for fastening a pole (45) standing off from a foundation, provided with a base member (11) to be anchored in the foundation and a pole supporting member (16) which has connecting surfaces (18, 19) proceeding transversally to the base wall (13) of the base member (11). The base member (11) is fastened in a support (17) through an access opening (15) being dimensioned big enough, directly or by means of an anchor body (32). Subsequently, a stud bolt (27) is secured to the base member (11) in the region of the access opening (15). Thereupon, the pole supporting member (16) is placed upon the stud bolt (27) and secured to the base member (11) in the proper angular position by screwing a nut (42) on the stud bolt (27).

9 Claims, 4 Drawing Figures

GROUND SECURING DEVICE

This invention relates to a base support for fastening a pole standing off from a foundation, provided with a base member to be anchored in the foundation which shows below a base wall being attachable in relation to the foundation by a central anchor bolt and rotatable around a first rotation axis which is substantially perpendicular to the foundation, with or without an axially insert-connectable anchor body, above it an all around running side wall, and on the top an access opening surrounded by a circular, ring-shaped bearing surface which proceeds transversely to the base wall and has such a dimension that through the access opening the anchor bolt is insertable and accessible, and provided with a pole supporting member showing above a connecting area for the pole, below an all around running side wall, and at the bottom a mounting wall having a circular supporting surface which is complementary to the bearing surface, whereby the mounting wall is provided with a central boring for permitting a rotation around a second rotation axis proceeding perpendicular to the bearing or supporting surface, whereby the central boring serves for passing through a stud bolt which has a perpendicular position to the bearing or supporting surface and secures the mounting wall to the base wall, thus establishing a firm axial clamp joint between the bearing and the supporting surface, the stud bolt being axially braced towards the mounting wall and accessible by an access opening in the upper region of the pole supporting member. A pole, within the meaning of the invention, is any oblong structural member which shall be secured with one end to the base. Profiles of any type which particularly also include hollow sections, may be concerned herewith. The definition of the term base support for pole means, in the most far-reaching understanding, that it not only applies to horizontal and inclined floors but also to perpendicular or even salient walls.

According to a prior known base support for pole of the type (CH-PS No. 622 845), the pole supporting member has to be attached to the base member by a relatively complicated construction of a bayonet catch-type connecting arrangement the loading capacity of which is not very high, so that only relatively lightweight, oblong structural members can be disposed at the pole supporting member which are not subjected to great lateral stress. On the other hand, however, the bayonet catch-type connecting arrangement can not be omitted since the pole supporting member has to be open on top for operating the central anchor bolt as well as for its insertion or removal.

A further base support for fastening a pole standing off from a foundation and having a base member to be fixed at the foundation is already known (FR-OS No. 23 13 525), whereby axially salient projections jutting from the mounting wall of the pole supporting member engage into corresponding annular recesses of the base member in order to provide an insert connection assuring an aligned fit between the base member and the pole supporting member. The axial bracing of the two members is effected by several screws disposed around the perimeter of the second rotation axis. It is a drawback of this heretofore known base support that the fixing screws respectively their co-operating nuts and counter-spanners have to be accessible from the side of the base member turned towards the foundation and that peripheral holes must be provided for passing through the screws, so that the design of the base member in the shape of a cylinder being laterally closed by a smooth wall proves to be impossible, mounting expensive and the angle of rotation of the pole supporting member is limited. This base support turns out to be unfit for high stress.

The object of this invention is to obtain a base support for fastening a pole of the type described at the outset which is also suitable for securely maintaining heavyweight poles which are exposed to great lateral stress, i.e. in general for oblong structures which, however, are at the same time mountable and adjustable by usual tools in a most simple way, whereby an overall compact exterior structure shall be achieved substantially giving the base support the design and aspect of a base usually provided for fastening bar-shaped structural members or poles at foundations or walls having practically a closed circumferential wall, so that after mounting at the foundation the individual attachment means are neither visible nor accessible from outside.

To solve this problem, the invention provides that an axial, dynamically balanced insert connection, concentric to a second rotation axis, is intended radially outside the access opening between the base wall and the mounting wall, and that the central stud bolt in the peripheral region of the access opening is attached to the base member by a screw joint being accessible and operatable from above at least when the pole supporting member is removed.

Thus, according to the invention, the space between the axially symmetrical and a relatively large cross-section showing insert connection is utilized in order to obtain there, by means of the stud bolt being accessible from above, an additional, solid connection between the base member and the pole supporting member. Hereby, the individual retaining components are not only easily accessible and operatable from above, e.g by means of box wrenches, but also an extremely compact arrangement of the attachment means, particularly by radial nesting, is obtained. In radial direction there are following successively from inside to outside: the collar of the access opening, the screw joint or screw joints for a perfect tightening of the stud bolt at the base member, and finally the insert connection establishing an additional junction between the two members, which, for instance, may consist of an axial projection at the one member and an annular recess, complementary hereto, at the other.

According to a first, preferred form of construction, the stud bolt is arranged at a carrier plate which is fastened at the base member by the screw joint in the peripheral region of the access opening. Contrary to the prior known bayonet catch-type connection (CH-PS No. 622 845), according to the invention the carrier plate together with the stud bolt standing off vertically from the bearing or supporting surface, is secured to the base member, yet before mounting the pole supporting member to the base member being fixed to the foundation, so that, when mounting the pole supporting member, the carrier plate already forms a solid part of the base member. In other words, according to the invention the steps of attachment of the stud bolt at the base supporting member, and of the pole supporting member at the latter by means of the stud bolt are deferred, thus essentially facilitating assembly and permitting, in addition, in virtue of the separate attachment of the stud bolt to the base member, a substantially more solid connection that resists all kinds of strain. In this way, also the essential disadvantage of the arrangement according to FR-OS No. 23 13 525 will be avoided which requires that during the assembly of the pole supporting member, the base member has still to be accessible from below.

According to the invention, the procedure is therefore to secure at first the stud bolt, necessary for joining the two members, to the base member, while the pole supporting member is still removed and then to place upon and screw down the pole supporting member.

In accordance to a first, particularly preferred embodiment, the attachment of the carrier plate can be effected in such a manner that the carrier plate has a screw thread at its periphery forming the screw joint together with a female thread at the periphery of the circular access opening within the base member. For the purpose of easy mounting a hexagon head can be provided on the carrier plate at the base of the stud bolt and concentric to the latter, which radially projects over the stud bolt and serves for applying a box wrench. Thereby, the carrier plate can be tightened down after screwing it into the base member.

In this embodiment, the access opening is defined by the interior parameter of the female thread, so that also in this case—even if only insignificantly—the screw joint is placed radially outside the access opening. The insert connection, too, has to be arranged only very little radially outside the screw joint.

Following another aspect, the carrier plate may also overlap an interior projection of the base member being located radially outside the access opening and fastened thereat by a screw joint consisting of screws and the relating tapholes. Since several screws are requisite in that case, assembly certainly take more time but on the other hand, providing several small tapholes laterally of the access opening instead of one unique, large taphole within the access opening, in some cases represents an advantage.

An especially simple method is characterized in that a female thread is provided in the base member, at the periphery of the access opening, where the male thread of the stud bolt is screwed in, having a diameter which corresponds to the diameter of the access opening.

In that case, the pole supporting member is placed but upon the base member before the stud bolt, showing a relatively large diameter, is screwed in for connecting the two members; this, however, does not entail any disadvantage in respect to the assembly as the two members are already perfectly connected, axially aligned, by the insert connection before screwing in the stud bolt, and subsequently only the central stud bolt has to be inserted or screwed into the jointly aligned access borings of the two members. Since the screw joint is intended to be placed within the base member i.e. at an interior projection being secured to it, this construction, too, allows to insert the stud bolt from above which means that the base member must not be accessible from below.

A further advantageous embodiment of the invention is characterized in that also between the base wall of the base member and an anchor body fixed within the foundation, an axial, dynamically balanced insert connection being concentric to the first rotation axis is provided. Hereby, a perfect rotation of the base member around the first axis can be effected which will be appropriate for an exact alignment of the attached pole and of the attached, bar-shaped structural member, respectively.

In addition, the insert connection assures a firm maintenance at the foundation.

Neither the prior known base support for pole according to CH-PS No. 622 845 nor that one according FR-OS No. 23 13 525 are forming a substantially cylindrical base.

Therefore, it is the object of this invention to supply a base support of the type as described by the way of introduction that substantially shows the compact pattern and aspect of a conventional base with a circular cross-section. In order to solve this further problem, the invention intends the base member and the pole supporting member to have a substantially circular cylindrical cross-section, whereby particularly the base member and the pole supporting member shall substantially present an identical external diameter when adjusting their cylinder axes.

When fully axially aligning the two members, it outwardly shows the feature of any conventional base, the attachment means of which are inaccessible from outside provided that the pole is undetachably fixed within the pole supporting member.

Figure 1A:
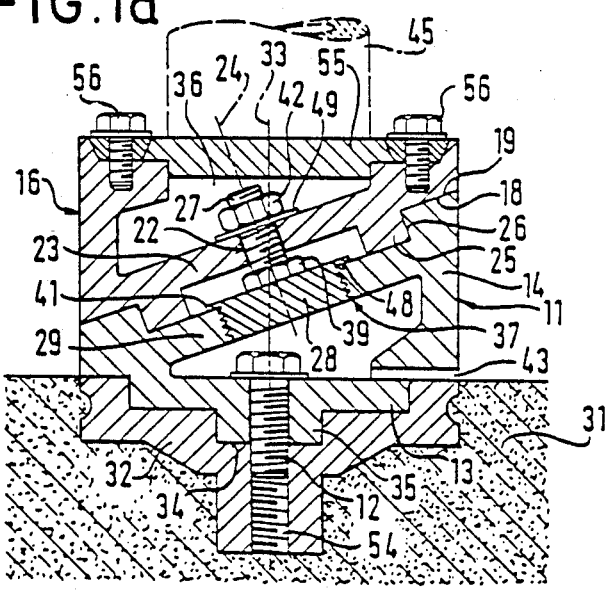
Figure 2:
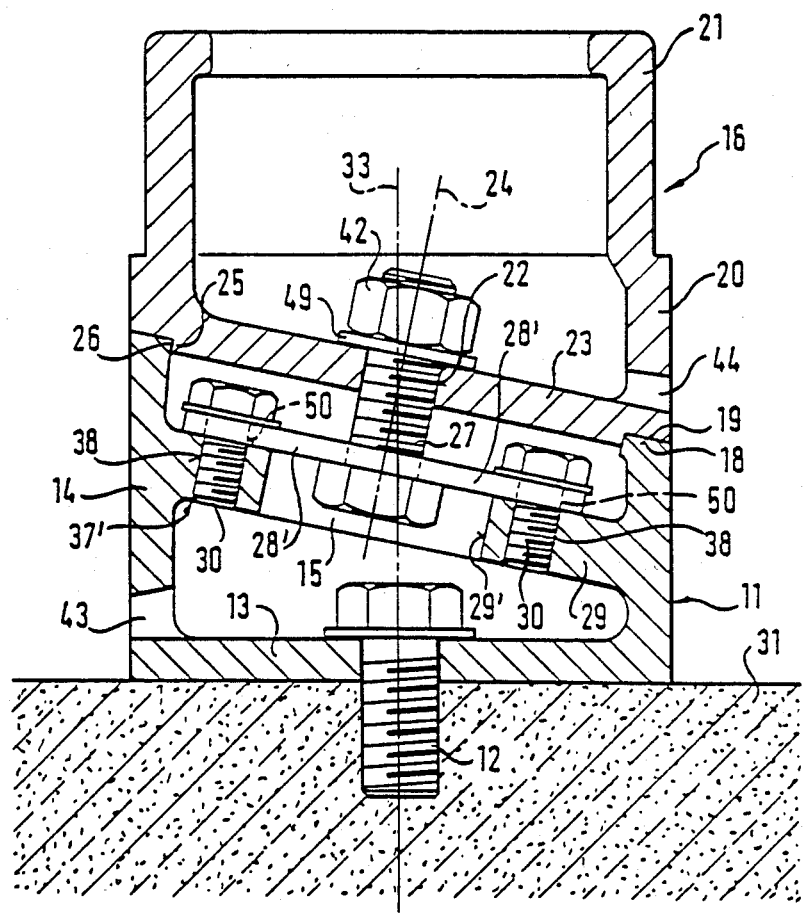
Figure 3:
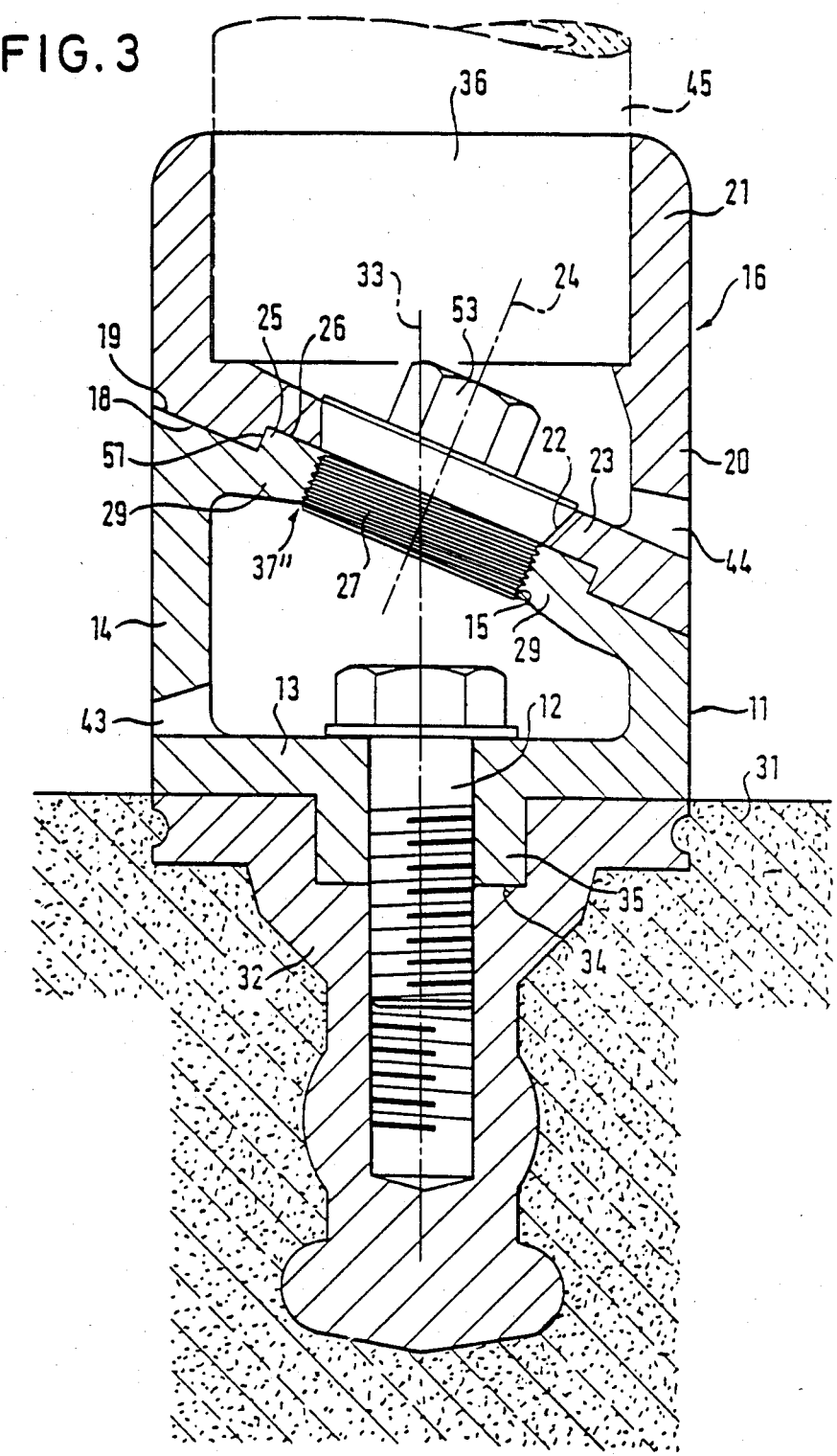

The invention will be apparent from the following description, made by way of example with reference to the accompanying diagrammatic drawings, wherein:

FIG. 1 is a partial sectional side view of a first embodiment of the base support for pole according to the invention arranged at a foundation 31, FIG. 1a is a variation of the embodiment according to FIG. 1, FIG. 2 is a second embodiment of the base support for pole according to the invention and, FIG. 3 is a third embodiment of the base support for pole according to the invention.

According to FIG. 1, the base support for pole according to the invention consists of a base member 11 with a circular, plain base wall 13 which is fixed at the foundation 31 by means of an anchor bolt 12 passed through a central boring 40. The base wall 13 is resting flat on the foundation 31 and the anchor bolt 12 is screwed in a support 17 (represented in FIG. 1 only in broken lines) which may be, for instance, a dowel or a steel support.

The central boring 40 within the base wall 13 defines with her axis a first rotation axis 33 being perpendicular to the top surface of the foundation 31 and around which the base wall 13 can be twisted to obtain a desired position before tightening down the anchor bolt.

A side wall 14 showing a circular cylindrical cross-section extends from the base wall 13 off the foundation and parallels the first rotation axis 33, terminating at an elliptic, ring-shaped, oblique bearing surface 18 which results from a cut running transversely to the first rotation axis 33 and proceeds in a distinct angle of e.g. 22,5° towards the base wall 13.

In its upper region, the side wall 14 shows interior projections 29 which define an access opening 15 in the shape of a disk paralleling the bearing surface 18 and being distinctly dislocated to the right in relation to the first rotation axis 33, as can be seen from FIG. 1, so that the center line of the circular access opening 15, defining a second rotation axis 24, intersects the base wall approximately at half its radius.

At the periphery of the access opening 15, the inside projections 29 of the base member 11 are provided with a female thread in which a circular disk-shaped carrier plate 28 with a matching male thread is screwed from above forming a screw joint 37 between the carrier plate 28 and the base member 11. A flange 41 at the upper level of the carrier plate 28 co-operates with a ring step 48 projecting radially outwards at the upper extremity of the access opening 15 and limiting herewith the thread reach of the carrier plate 28 in the access opening 15. Moreover, by tightening the screwed-in carrier plate 28, a joint, detachable with a tool, between the carrier plate 28 and the base member 11 can be established in that way.

From the center of the carrier plate 28 and perpendicular to the latter extends a stud bolt 27 surrounded in the area of connection with the carrier plate 28 by a radially somewhat over the stud bolt 27 projecting polygon head 39 onto which a box wrench is attachable from above.

As can be seen in FIG. 1, a substantially cylindrical pole supporting member 16 is placed onto the base member 11, whereby the stud bolt 27 extends through a central boring 22 in the mounting wall 23 provided below and proceeding perpendicular to the second rotation axes 24, i.e. transversely to the cylinder axis of the pole supporting member 16, the mounting wall showing radially outwards a supporting surface 19 facing the latter and parallelling the bearing surface 18. At the side facing the base member 11, the mounting wall 23 has an annular projection 25 engaging axially into an annular recess 26 of the base member 11 and proceeding concentric and axially symmetrical to the second rotation axis 24. The annular projection 25 and the annular recess 26 are forming an insert connection which form-closingly and fittingly joins the base member 11 and the pole supporting member 16, still permitting, however, a rotation around the second axis 24.

By screwing a nut 42 on the upper extremity of the stud bolt 27 after placing a washer 49, the ring-shaped supporting surface 19 provided at the underside edge of the mounting wall 23, and the hereto complementary bearing surface 18 are firmly joined together.

From the mounting wall 23, in the rotary position of the pole supporting member 16 illustrated in FIG. 1 where the center axes of the pole supporting member 16 and the base member 11 are axially aligned, proceeds perpendicular to the base wall 13 a circular cylindrical side wall 20 being flush with the side wall 14 which ends in a connecting region 21 for taking-up a pole 45 to be attached to the pole supporting member 16. In the case of the embodiment represented in FIG. 1, the connecting area 21 is developed as a recess forming at the same time the access opening 36 for the nut 42 in the upper region of the pole supporting member 16 in which the pole 45 developed in the form of a hollow section is insertable from above and attachable by means of a spring detent 47 snapping into a catch recess 46 of the pole supporting member 16.

Lateral holes 43, 44 serving as outlets for possibly collecting liquids are provided at the deepest points of the cavities of the base member 11 and the pole supporting member 16.

Assembly of the base support according to the invention is effected as follows:

At first, the base member 11 is fastened to the foundation 31 by means of the anchor bolt 12 by screwing it in the prior arranged dowel 17, whereby the anchor bolt 12 is inserted through the access opening 15 and tightened down with a box wrench passed through the access opening 15.

Before finally tightening the anchor bolt 12, the pole supporting member is placed onto the base member 11 and both members are twisted until the rotary position required for the desired angle position of the pole 45 is reached and this position is marked.

Thereupon, the pole 45 is removed again by detaching the stop spring 47 with a special tool, and the anchor bolt 12 is secured to the support 17.

After that, the carrier plate 28 is screwed into the access opening 15 until the flange 41 rests on the ring step 48 at the transition from the annular recess 26 towards the narrower access opening 15. The carrier plate 28 is tightened by means of a box wrench put onto the polygon head 39 so that between the carrier plate and the inside projections 29 a screw joint 37 is established, firmly securing the two parts to one another.

Subsequently, the pole supporting member 16 with the central boring 22 is placed upon the stud bolt 27, whereby the annular projection 25 engages simultaneously into the annular recess 26. The axial length of the annular projection 25 is so dimensioned as to finally make the supporting surface 19 securely rest on the bearing surface 18.

Thereupon, after interposing a washer 49, the nut 42 can be screwed on and tightened down through the access opening 36 at the extremity of the stud bolt 27 projecting upwards beyond the mounting wall 23.

At this stage, a pole base suitable for a secure attachment of the pole 45 is established in which only the pole 45 must be inserted, whereby the stop spring 47 snaps into the catch recess 46. As the stop spring 47 is only detachable from outside by a special tool, the pole 45 is attached robbery-proof to the base formed by the members 11, 16.

In the following Figures like parts are designated by like numerals just as in FIG. 1.

As illustrated in FIG. 1a, the anchor bolt 12 is not directly connected with the support 17 but screwed into an anchor body 32 being cast into the foundation 31, whereby the anchor body may be a metal casting just as the members 11 and 16 and provided with a central boring 54 with a female thread for screwing in the anchor bolt 12.

On the top, the anchor body 32 is in flush contiguity with the top surface of the foundation 31. It shows, however, an annular recess 34, concentric to the anchor bolt 12, into which an axial annular projection 35, complementary hereto and located at the underside of the base wall 13 of the base member 11, engages fittingly in a manner that the lower surface of the base wall 13 rests on the upper surface of the anchor body 32. In that way, the base member 11 is maintained more securely at the foundation 31 in two stages 13, 35 and is, in addition, more definitely rotatable around the first rotation axis 33.

Unlike the above described embodiment shown in FIG. 1, the access opening 36 is closed on top by a plate 55, having at its underside an annular projection being concentric from inside to outside and engaging into an annular recess fitting through the inner projection and which is fastened with screws 56 through a two-part clamp collar to the upper side of the pole supporting member 16. A pole 45 with an optional cross-section, only sketched in broken lines, is attached to the plate, e.g. by welding.

According to the embodiment in FIG. 2, the carrier plate 28' of the stud bolt 27 overlaps at the upper side the preferably ring-shaped inner projection 29, the interior peripheral surface 29' of which is concentric to the second rotation axis 24 and defines the access opening 15 for the anchor bolt 12.

The inner projection 29 presents tapholes 38 proceeding in constant angle distances parallel to the second rotation axis 24 and which are aligned with clearance holes 50 in the overlapping regions of the carrier plate 28'. Screws 30 provided with heads are passed through these clearance holes and screwed in the tapholes 38, forming a screw joint 37' through which the stud bolt 27 arranged on the carrier plate 28' by a thread or by welding is form-closingly attached to the base member 11. In this version, the annular projection 25 of the pole supporting member 16 is distinctly located radially outside the thread joints 37' and co-operates in its turn with an annular recess 26 which has likewise a very large radius, in the form of a ring step.

Thus, in the case of this embodiment, the access opening 15, the thread joints 37' and the insert connections 25, 26 are clearly radially displaced from one another.

Assembly is effected analoguous with the embodiment represented in FIG. 1, i.e. the base member 11 together with the pole supporting member 16 is brought into the proper angle position and is marked. Subsequently, the carrier plate 28' together with the stud bolt 27 is fixed by the screws 30 to the base member 11 and the pole supporting member 16 is placed upon the connection bolt 27 and attached to the base member 11 by means of the nut 42.

FIG. 3 shows an embodiment, in which similar to the embodiment shown in FIG. 1, the annular interior projection 29 of the base member 11 at the periphery of the access opening 15 is provided with a female thread. Radially outside are located the female thread, the axial annular projection 25 of the base member 11 and the hereto complementary annular recess 26 of the pole supporting member 16. The annular projection 25 and the annular recess 26 are passing over radially outside, across a ring step 51, to the bearing surface 18 and the supporting surface 19, respectively.

According to the embodiment shown in FIG. 3, the mounting wall 23 of the pole supporting member 16 has a central boring 22 which shows a far greater diameter than the variations described above. The diameter of the central taper boring 22 proceeds into the diameter of the herewith axially aligned access opening 15.

The tapered stud bolt 27 engages into the complementary mounting wall 23. A hexagon head 53 which is intwistably secured to the stud bolt 27 serves for tightening by means of a tool passed-in from above.

In the case of this embodiment, assembly is effected in such a way that after angling and marking the alignment and fastening the base member 11 by means of the anchor bolt 12, the pole supporting member 16 is set upon, whereafter at first the stud bolt 27 for establishing the thread connection 37" is screwed in the female thread of the inner projection 29 and settled herewith, whereby the two surfaces 18, 19 of the members 11, 16 are secured to one another.

At last, the pole 45 is pushed into the access opening 36 and fastened in the appropriate way.

I claim:

1. A base support for fastening a pole standing off from a foundation, provided with a base member or an anchor body having below a base wall being attachable in relation to a foundation by a central anchor bolt or a connecting bolt and rotatable around a first rotation axis which is substantially perpendicular to the foundation, above it an all around running side wall and on the top an access opening surrounded by a ring-shaped bearing surface proceeding transversally to the base wall and showing such a dimension that through the access opening the anchor bolt is insertable and accessible, and with a pole supporting member presenting at the top a connecting area for the pole, below an all around running side wall and at its bottom a mounting wall having a ring-shaped supporting surface which is complementary to the bearing surface, whereby the mounting wall is provided with a central boring for permitting a rotation around a second rotation axis proceeding perpendicular to the bearing or supporting surface, whereby the central boring serves for passing through a stud bolt which has a perpendicular position to the bearing or supporting surface and secures the mounting wall to the base wall, thus establishing a firm axial clamp joint between the bearing and the supporting surface, the stud bolt being axially braced against the mounting wall and accessible through an access opening in the upper region of the pole supporting member, characterized in that radially outside the access opening (15), between the base wall (13) and the mounting wall (23), an axial, dynamically balanced insert connection (25, 26), is provided being concentric to a second rotation axis (24), and that the central stud bolt (27) is fastened at the base member in the peripheral area of the access opening, still radially inside the insert connection (25, 26), however, by a screw joint (37, 37', 37"), being accessible and operatable from above.

2. A base support for pole according to claim 1, characterized in that the stud bolt (27) is arranged at a carrier plate (28, 28') which is attached to the base member (14) by the screw joint (37, 37') in the peripheral region of the access opening.

3. A base support for pole according to claim 2, characterized in that the carrier plate (28) shows a screw thread which forms the screw joint (37) together with a female thread being located at the periphery of the circular access opening (15) inside the base member (11), respectively at an annular inner projection (29) of the base member (11) (FIG. 1).

4. A base support for pole according to claim 2, characterized in that the carrier plate (28') overlaps an inner projection (29) located radially outside the access opening (15) of the base member (11) and is fastened to it by the screw joint (37') consisting of screws (30) and the relating tapholes (38) (FIG. 2).

5. A base support for pole according to claim 1, characterized in that at the periphery of the circular access opening (15) a female thread is provided inside the base member (11) respectively at an annular inner projection of the base member (11) where the male thread of the stud bolt (27) provided with an enlarged diameter corresponding to the diameter of the access opening (15) is screwed in for forming the screw joint (37").

6. A base support for pole according to claim 1, characterized in that also between the base wall (13) of the base member (11) and an anchor body (32) fastened in the foundation (31) there are provided dynamically balanced, axial insert connections (34, 35) which are concentric to a first rotation axis (33).

7. A base support for pole, particularly according to claim 1, characterized in that the base member (11) and the pole supporting member (16) substantially show a circular cylindrical diameter.

8. A base support for pole according to claim 7, characterized in that the base member (11) and the pole supporting member (16) substantially present an identical outside diameter when aligning their cylinder axes.

9. A base support for pole according to claim 1, characterized in that the ring-shaped bearing surface (18) and the base wall (13) enclose an angle of 20°–25°, particularly of 22.5°, in order to permit a continuous adjustment of the cylinder axis of the pole supporting member (16) between a position aligned with the rotation axis (33) to an angle below 40°–50°, particularly to 45°.

* * * * *